US 8,408,352 B2

(12) United States Patent
Kasten et al.

(10) Patent No.: US 8,408,352 B2
(45) Date of Patent: Apr. 2, 2013

(54) ENERGY EFFICIENT POWER STEERING PUMP CONTROL SYSTEM

(75) Inventors: Frederick R. Kasten, Plymouth, MI (US); Darrel A. Recker, Ypsilanti, MI (US); Daniel K. Tuttle, Ann Arbor, MI (US); Ashraf Zeid, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 567 days.

(21) Appl. No.: 12/004,132

(22) Filed: Dec. 20, 2007

(65) Prior Publication Data
US 2009/0159360 A1 Jun. 25, 2009

(51) Int. Cl.
*B62D 5/065* (2006.01)

(52) U.S. Cl. ..... 180/422; 180/441; 180/417; 137/116.3; 91/437

(58) Field of Classification Search ............... 180/422, 180/441, 417, 421, 423; 137/116.3; 91/437
See application file for complete search history.

(56) References Cited

U.S. PATENT DOCUMENTS

| | | | |
|---|---|---|---|
| 4,473,128 A | 9/1984 | Nakayama et al. | |
| 4,629,025 A | 12/1986 | Brasier et al. | |
| 4,828,065 A | 5/1989 | Ishihara et al. | |
| 4,877,099 A | 10/1989 | Duffy | |
| 5,860,797 A | 1/1999 | Fujimura et al. | |
| 6,041,883 A * | 3/2000 | Yokota et al. | 180/422 |
| 6,069,460 A | 5/2000 | Grabowski et al. | |
| 6,524,076 B2 | 2/2003 | Konishi | |
| 6,560,961 B2 * | 5/2003 | Draper et al. | 60/384 |
| 6,988,581 B2 | 1/2006 | Croughs et al. | |
| 2004/0042912 A1 | 3/2004 | Youngpeter et al. | |
| 2004/0153228 A1 * | 8/2004 | Matsumoto et al. | 701/41 |
| 2004/0238257 A1 * | 12/2004 | Takahashi et al. | 180/402 |
| 2005/0186094 A1 | 8/2005 | Youngpeter et al. | |
| 2006/0219466 A1 * | 10/2006 | Khalil et al. | 180/418 |

* cited by examiner

*Primary Examiner* — Tony H. Winner
*Assistant Examiner* — Jacob Knutson
(74) *Attorney, Agent, or Firm* — Joseph E. Root

(57) ABSTRACT

An electronic control unit monitors pressure conditions present at the input to the steering system and other vehicle data signals and then provides override control of a hydro-mechanical flow control device. An electro-hydraulic valve is connected to the supply side of the hydro-mechanical flow control device and reacts to the electronic monitoring of pressure and other vehicle data to alter the counter-balancing forces within the hydro-mechanical flow control device. This causes a by-pass diversion of steering fluid to the source by the hydro-mechanical flow control device and thereby relieves backpressure on the pump when relatively little steering assist is required to be provided by the steering system. The control of steering fluid diversion at such times results in a significant reduction in parasitic losses within the steering system and improves the operating and fuel efficiency of the vehicle.

12 Claims, 3 Drawing Sheets

ENERGY EFFICIENT POWER STEERING PUMP CONTROL SYSTEM

BACKGROUND

1. Field of the Invention

The invention relates to the field of power steering pumps as used in automotive vehicles and more specifically to the area of improved energy efficiencies in flow control devices that are used to control the delivery of hydraulic fluid to steering assist valves.

2. Description of the Prior Art

In conventional power assist steering systems, many techniques are used to position the location of a spool within a control valve to regulate the delivery of a constant amount of hydraulic fluid from a pump to a steering assist valve. Because the flow from the pump increases or decreases depending on the pump rotary speed, the flow regulation mechanism of the control valve is necessary to maintain a constant flow to the steering assist valve independent of pump rotary speed. In most cases, a by-pass orifice is established in the control valve that allows excess steering fluid to be diverted back to the pump input port or a fluid source. Corresponding control of the position of the spool regulates the flow into the bypass orifice to thereby maintain a constant steering fluid flow delivered to the steering assist valve while the pump is driven at rates that increase or decrease depending only on the speed of the engine or other power source.

In such conventional power assist steering systems the pump provides a relatively high outlet flow at high pressure even when no steering assist is required. One such instance occurs when the vehicle is in a stationary or parked position with the motor running and no steering effort is being applied by the vehicle operator. Similarly, the pump provides a high output flow when the vehicle is moving at a high speed and low power assist is desired to be applied to the actuator. High flow creates higher pressure and increases the torque required to drive the pump. Such drive torque demand on the engine directly affects vehicle horsepower output and fuel efficiency.

SUMMARY OF THE INVENTION

It is an object of the present invention to reduce fuel consumption and improve operating efficiency of a motorized vehicle by minimizing the pressure on the power steering pump, and reducing the consequent torque demanded by the pump when no or relatively low steering assist is required.

Another object of the present invention is to provide a system that reduces fluid flow to the steering system when little or no steering torque is required. The reduced flow reduces energy losses by reducing the flow circulating through orifice restrictions in the pump and steering system.

Another object of the present invention is to provide a system that reduces pressures on the supply side of a hydro-mechanical flow control device while maintaining regulated flow.

A further object of the present invention is to provide a hydro-mechanical flow control device with an electronic pressure control ("EPC") system that senses fluid pressure output to the steering valve and utilizes input data from the vehicle to determine when and how much of the output flow from the engine driven power steering pump can be directed to the steering valve and/or to the by-pass orifice, and thereby relieve the pump pressure.

These objects are achieved by a control system for reducing parasitic losses in a power steering system of an automotive vehicle during periods of low demand for power assist and high pump output due to engine speed. A hydraulic pump is driven by the engine or other power source of the vehicle and provides an output of steering fluid to the steering system under pressure. A source of steering fluid is connected to the pump and supplies steering fluid to the pump and receives returned fluid from the power steering and control systems. A hydro-mechanical flow control device, containing a spring biased spool is connected to both the output of the pump and the input to the steering system. The flow control device reacts to predetermined flow and pressure conditions that exist between the output of the pump and the flow and pressure conditions present at the input to the steering system. The flow control device provides a diversion of steering fluid to the source when the pump output pressure is significantly greater than the pressure conditions present at the input to the steering system. The flow control device thus regulates and maintains constant the flow of steering fluid to the steering assist valve as the output of the pump increases or decreases depending on engine rotary speed. The improvement includes the use of an electronic control unit that monitors pressure conditions present at the input to the steering system and other vehicle data signals and then provides override control of the hydro-mechanical flow control device. An electro-hydraulic valve is connected to the supply side of the hydro-mechanical flow control device and reacts to the electronic monitoring of pressure and other vehicle data to alter the counter-balancing forces within the hydro-mechanical flow control device. This causes a by-pass diversion of steering fluid to the source by the hydro-mechanical flow control device and thereby relieves backpressure on the pump when relatively little steering assist is required to be provided by the steering system. The control of steering fluid diversion at such times results in a significant reduction in parasitic losses within the steering system and improves the operating and fuel efficiency of the vehicle.

In one particular aspect of the invention, an electrically regulated valve is strategically located in parallel with the input to the supply side of a hydro-mechanical flow control device to selectively relieve pressure at the supply side, when desired. When the electric valve is activated, the pressure at the supply side of the spool in the flow control device is reduced and the spool responsively moves towards that lower pressure to open or further open the by-pass orifice. Further opening of the by-pass orifice allows an increase of fluid from the pump to be diverted back to the pump inlet and thereby reduces pump output pressure and flow at the steering valve. Such pressure reduction relieves backpressure on the pumping mechanism of the pump thus reducing the torque on the pump shaft and consequently on torque losses from the engine. The electric valve is electronically controlled according to various inputs selected from the group of data that reflect vehicle speed, steering wheel angle, steering wheel turn rate, steering wheel torque, steering wheel straight ahead position, vehicle lateral acceleration, tie rod force, steering fluid flow rates, and pump output pressure. In this manner, the electrically regulated valve provides enhanced control to the hydro-mechanical flow control device at times when no or relatively low power steering assist is required. Such enhanced control results in a correspondingly regulated by-pass diversion of the pump output that minimizes back pressure on pump and pump driving shaft when no or low steering assist is required. This is achieved independent of the regulation provided by the flow control spool valve during normal vehicle operation when power steering assist is required.

DETAILED DESCRIPTION OF THE PREFERRED EMBODIMENT

Figure 1:
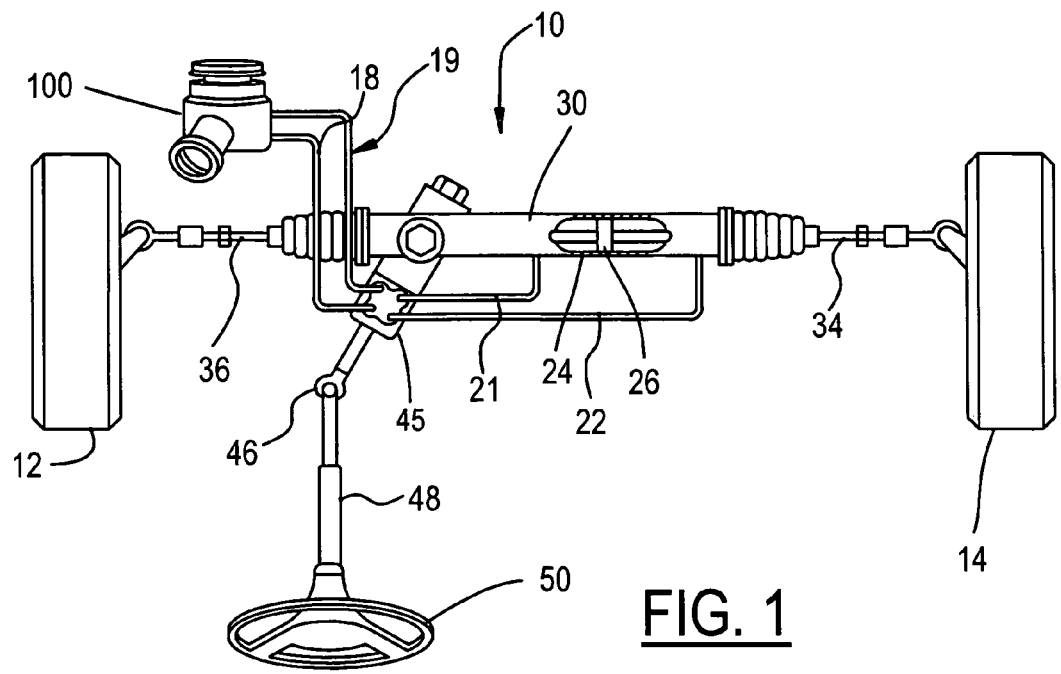
FIG. 1 is a representation of a typical engine driven vehicle power steering system.

FIG. 1 illustrates a conventional power steering system 10, as is typically employed in an automotive vehicle. Steering system 10 includes a steering gear 24 and a hydraulic assist piston 26 in a housing 30. (Many possible steering mechanisms, such as, but not limited to, rack and pinion, re-circulating-ball, or worm-roller mechanisms may be used.) A steering wheel 50 is shown connected to a steering column 48 and, through a rotating universal joint 46, to steering assist valve 45. Tie rods 34 and 36 extend from steering gear 24 and provide the interconnection between the steering gear 24 and wheels 12 and 14, which are mounted to the vehicle chassis (not shown). An engine driven pump assembly and reservoir 100 provides power steering hydraulic fluid under pressure through an outlet line 18 to torque driven steering assist valve 45. A portion of the pumped fluid is supplied from steering assist valve 45 to the steering gear through output lines 21 and 22. This pressurized fluid acts on hydraulic piston 26 to assist the steering effort exerted on the steering wheel by the vehicle operator. The fluid that is circulated in steering assist valve 45 and housing 30 is returned to a pump reservoir 20 through line 19.

Figure 2:
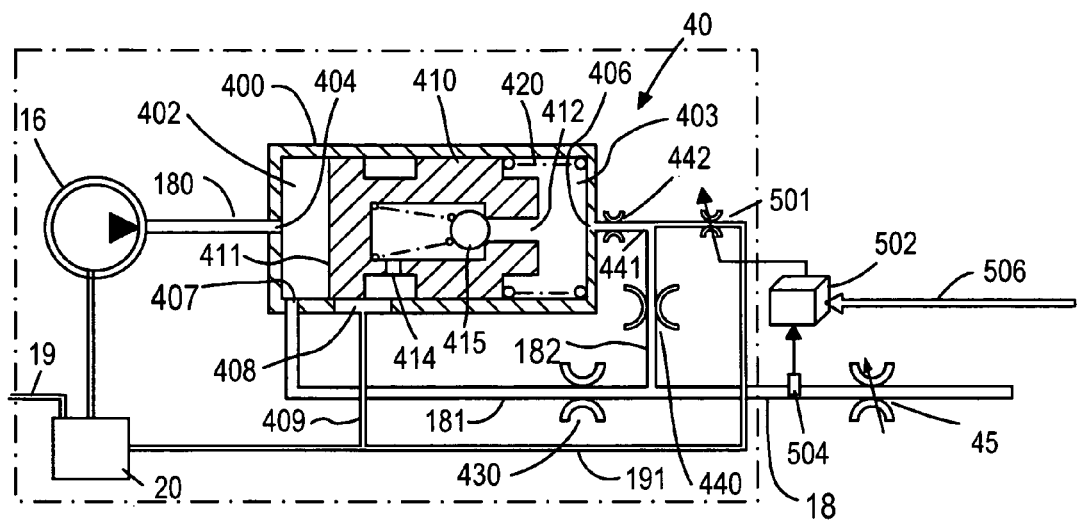
FIG. 2 is a schematic representation of a power steering pump system which includes a hydro-mechanical flow control device, with a bypass orifice, in a first normal mode incorporating an embodiment of the present invention.
Figure 3:
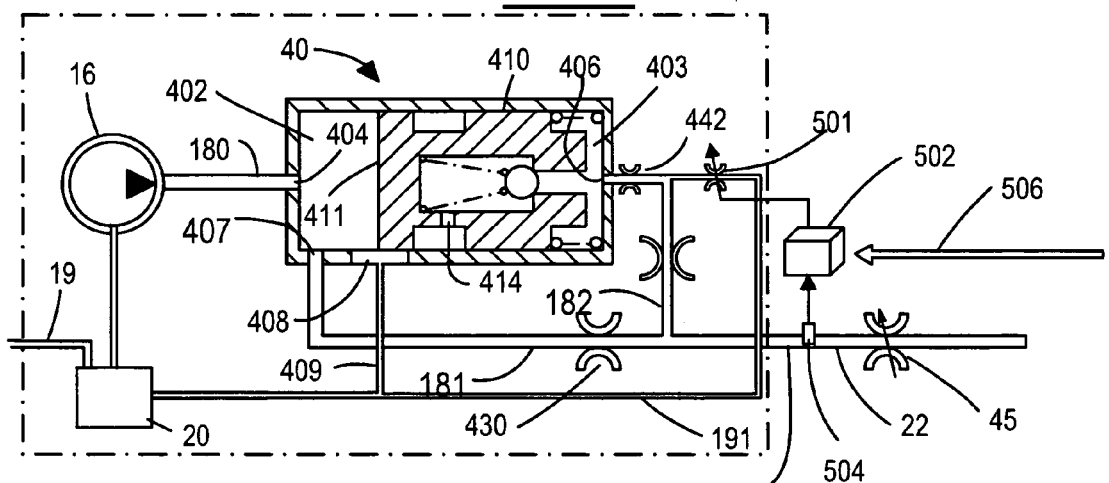
FIG. 3 is a schematic representation of hydro-mechanical flow control device of FIG. 2 in a second normal mode, and incorporates an embodiment of the present invention.
Figure 4:
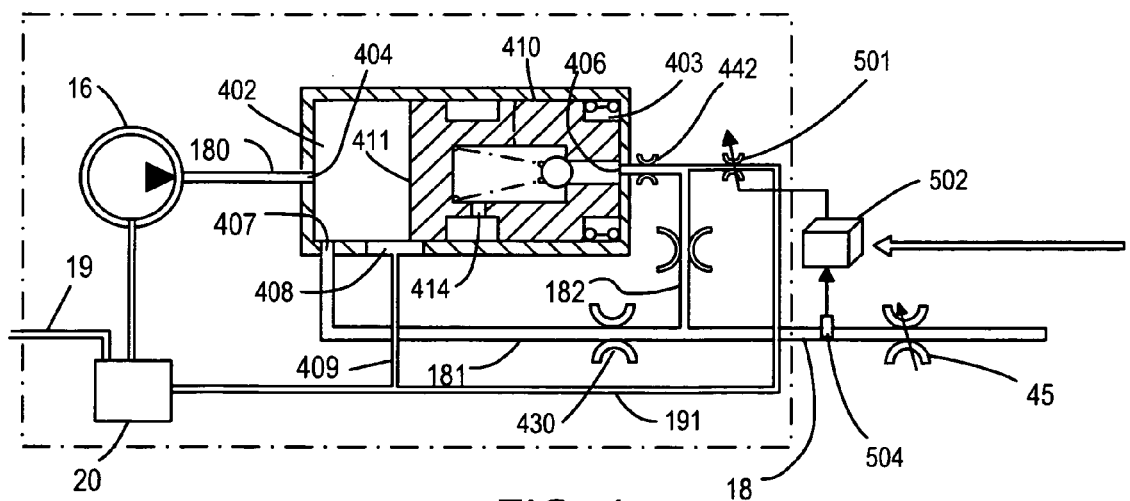
FIG. 4 is a schematic representation of hydro-mechanical flow control device of FIGS. 2 and 3, incorporating an embodiment of the present invention in an operational mode.

The power steering pump assembly 100 is schematically illustrated in FIGS. 2-4 with emphasis on a flow regulation system. The schematic depicts a system that includes an engine driven pump assembly 16, that receives its source of steering fluid for pumping from a an integrated reservoir 20. (Alternatively, the pump can receive its source of steering fluid from a closed system that may also include a fluid cooling system.) The output of pump 16 is connected directly to an output line 180 which leads through a pump side inlet 404 and into a pump side chamber 402 of a flow control valve device 40. The pump side chamber 402 also includes a pump side outlet 407 to which a line 181 is connected. A fixed orifice 430 is connected between line 181 and outlet line 18. A feedback line 182 extends from line 18 at the outlet side of orifice 430 to the supply chamber side of the flow control valve device 40. A feedback orifice 440 is located in line 182 in series with a damping orifice 442 and a supply side inlet 406 which leads to the supply side chamber 403. A line 409 forms a bypass path that extends from a by-pass orifice 408 in flow control device 40 directly to the inlet of the pump 16.

An electronic pump control ("EPC") 500 of the present invention is depicted as being an integral part of the pump system and includes at least one pressure sensor 504, shown in output line 18, to sense the pressure of fluid being output from the pump assembly 100 and applied to the steering assist valve 45. (It should be recognized that the location of the pressure sensor could be changed to other locations in the system where pump output pressure can be measured and that multiple sensors could be used, depending on the desired properties of the system and packaging limitations specified by the vehicle manufacturer. Also the pressure sensor could be eliminated if another type of sensor or a combination of sensors can be substituted to provide the same information.) An electronic control unit 502 functions to make appropriate calculations based on various data input signals received on data line 506 and to control the variable orifice of an electro-hydraulic valve 501. Electro-hydraulic valve 501 is located in a line 191 that, when used, functions to relieve pressure and provide a flow path for a minor volume of fluid from junction 441 to bypass line 409.

In the embodiment shown, flow control device 40 includes a valve bore valve bore 400 with a supply side inlet 406 and a by-pass return orifice 408, in addition to the pump side inlet 404 and pump side outlet 407 mentioned above. A spool 410 is contained within the valve bore 400 for linear movement therein. A pump side chamber 402 is located within the valve bore 400 and to the left of spool 410. The volume of pump chamber 402 is defined by the space existing within the valve bore 400 between the wall containing pump side inlet 404 and the valve face 411 of spool 410. A supply side chamber 403 is located within valve bore 400 and to the right of spool 410. The volume of supply side chamber 403 is defined by the space existing within the valve bore 400 between the wall containing supply side inlet 406 and the right side of spool 410. A spool biasing spring 420 is located in supply side chamber 403 and extends from the wall containing supply side inlet 406 to the spring face 413 on the right end of spool 410. Spool 410 contains a normally closed pressure relief check valve 415 that is in communication with supply side chamber 403 through a passage 412. Check valve 415 is in communication with a relief passage 414 and by-pass orifice 408 that allows fluid to flow through check valve 415 when the steering system pressure exceeds a limiting value.

In FIG. 2, spool 410 is shown as being located in a position within the valve bore 400 that causes by-pass orifice 408 to be closed and prevents fluid in pump chamber 402 from flowing into by-pass line 409. In this case, all steering fluid delivered from the pump 16 is delivered to the steering valve 45 through the fixed orifice 430. This is due to the differential pressure present across the spool 410. Differential pressure is derived from the fluid pressure in the supply side I chamber 403 combined with the biasing forces applied by spring 420 on spool 410 and the pump output pressure present in pump side chamber 402. High pressure in supply side chamber 403 normally occurs when the steering system demand is greatest. One such instance is when the vehicle is stationary, the engine is at idle, and the vehicle operator is turning the steering wheel. Maximum torque is demanded during such times and therefore the fluid output from pump 16 is delivered to steering assist valve 45, with no by-pass diversion occurring by flow control device 40. In the case shown in FIG. 2, the differential pressure forces spool 410 to a position that causes by-pass return orifice 408 to be closed.

In FIG. 3, spool 410 is shown as being located in a position within the valve bore 400 that provides a partially open by-pass return orifice 408 and allows a portion of the fluid in pump chamber 402 to flow into by-pass orifice 408 and line 409. The opening of by-pass orifice 408 means that a portion of the output from pump 16 flowing into the pump side chamber 402 is diverted and the output pressure in line 18 is reduced. The degree of opening of by-pass orifice 408 is due to the differential pressure existing across spool 410. The position shown in FIG. 3 reflects the case(s) where a lower torque demand is being made on the steering system and the pump pressure is higher than that produced when the engine is at idle. For instance, when the engine and pump 16 have their speeds increased, the flow output from pump 16 increases with a corresponding increase in pressure. As the torque demands of the steering system change, they are reflected as changes in pressure at steering assist valve 45, and flow control device 40 responds to changes in differential pressure by providing a greater or lesser amount of fluid flow and pressure by controlling the opening of by-pass return orifice 408.

FIG. 4 illustrates the effects of the present invention when it is activated under the influence of electronic control unit 502. In this case, the sketch depicts the situation where it has been determined by the logic of electronic control unit 502 that the pressure measured by pressure sensor 504 is high, and other vehicle data indicates that the demands presented by the steering system are low and therefore do not require significant fluid flow. Other vehicle data is provided to electronic control unit 502 in the form of signals reflecting vehicle speed, steering wheel position and steering wheel turning rate. EPC electro-hydraulic valve 501 is connected to the feedback line 182 and tapping into it for the purpose of providing a low pressure path from the feedback line (supply side inlet 406) to the input of the pump 16, when relatively little steering assist is required to be provided by said steering system. In this case, the pressure on supply side inlet 406 and supply side chamber 403 is reduced by the opening of EPC electro-hydraulic valve 501. When that occurs, fluid in the feedback path flows from junction 441 through electro-hydraulic valve 501 and into return line 191 back to reservoir 20. The reduction in pressure at supply side inlet 406 allows spool 410 to react to the higher pressure existing in pump side chamber 402 and move against the force provided by biasing spring 420. This movement of spool 410 causes the by-pass orifice 407 to become fully opened. The opened by-pass orifice 407 serves to relieve the pressure on the output line 18 and also to relieve the amount of backpressure that is present on pump 16. With such reduction in backpressure, the pump presents less of a load to the engine and has a positive impact on the overall efficiency of the vehicle. The results include better fuel consumption (mpg) characteristics. This condition is maintained until electronic control unit 502 senses a change in data and determines that flow control device 40 should be restored to its hydro-mechanical flow control operation to support steering assistance. Damping orifice 440 in the control line 182 is provided to prevent transient shudder during opening and closing of the EPC electro-hydraulic valve 501.

Figure 5:
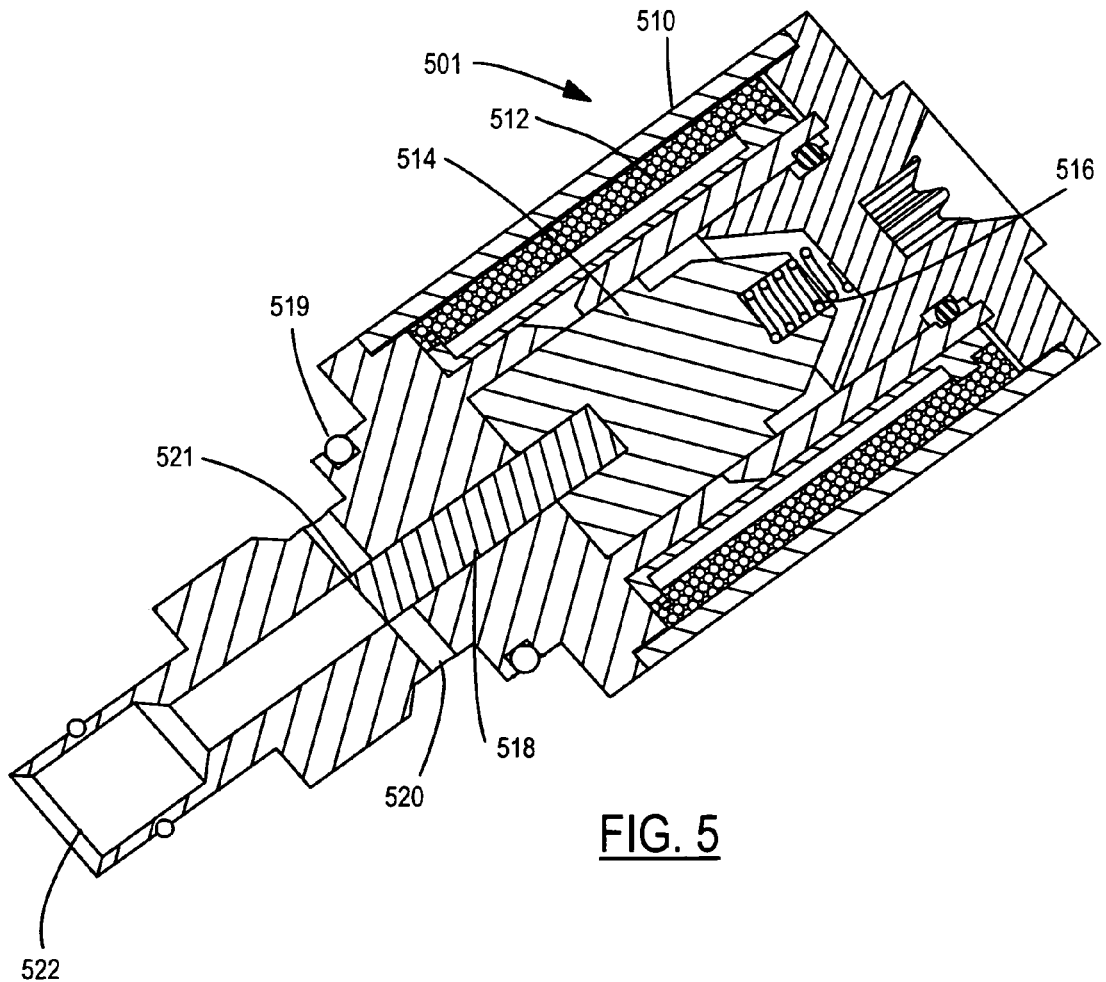
FIG. 5 is a cross-sectional view of an electro-hydraulic valve used in an embodiment of the present invention.

An embodiment of EPC electro-hydraulic valve 501 is shown in FIG. 5. EPC electro-hydraulic valve 501 includes a housing 510, an electrical coil 512, and an armature 514. A valve plunger 518 extends from armature 514 and intersects a junction 521 between an outlet passage 520 and an inlet passage 522. A biasing spring 516 acts to maintain armature 514 and valve plunger 518 in a position where the junction 521 of outlet passage 520 and inlet passage 522 is normally closed. When sufficient current flows in coil 512, armature 514 is caused to move against the bias forces provided by spring 516 and valve plunger 518, traveling with armature 514, opens the junction 521 between inlet passage 522 and outlet passage 520. EPC electro-hydraulic valve 501 is controlled to open the junction 521 at an infinite number of positions between its fully closed position and its fully open position, depending on the amount of current flowing in coil 512.

Figure 6:
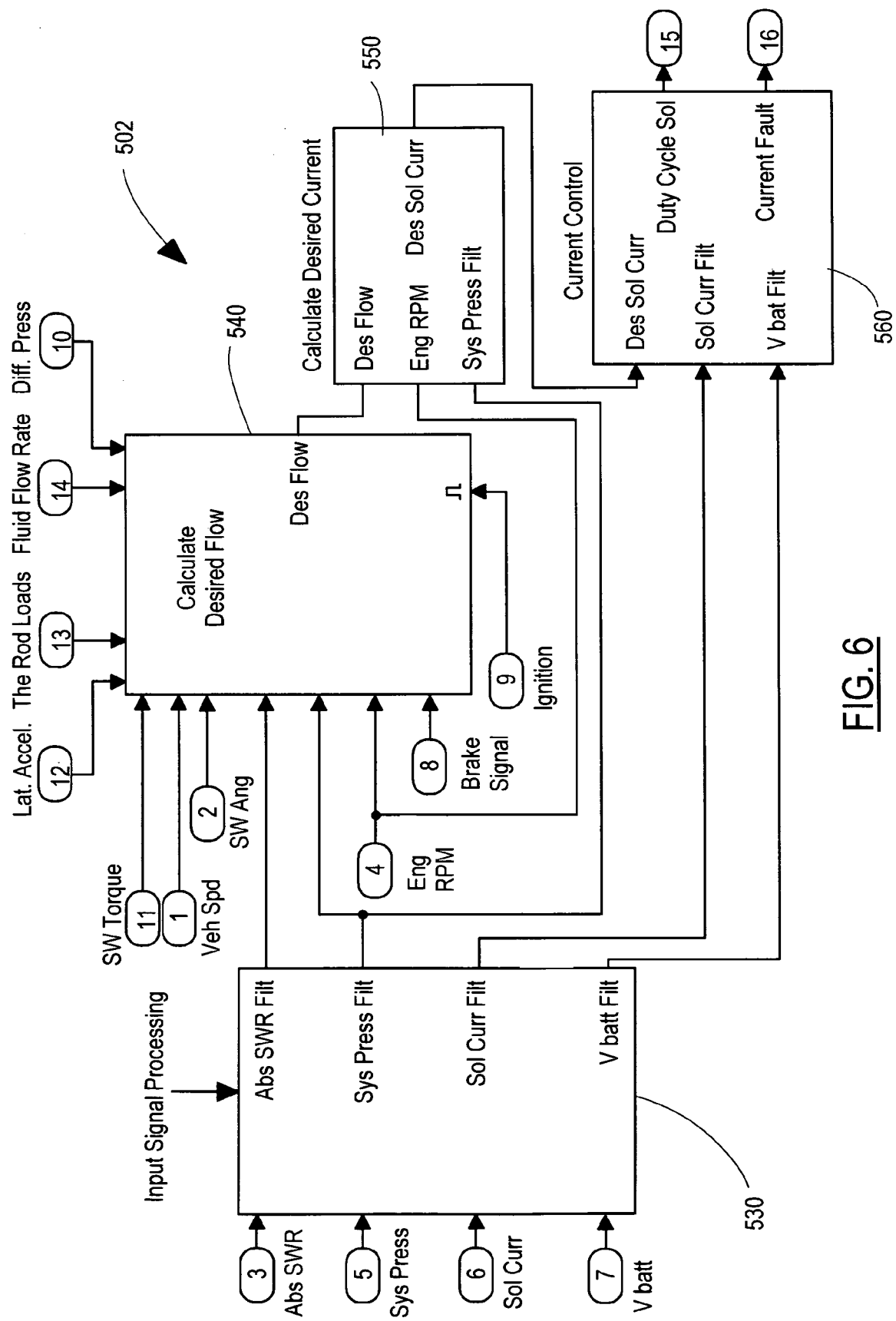
FIG. 6 is a block diagram of the EPC controls used in the present invention.

In calculating the amount of current that must be applied to EPC electro-hydraulic valve 501 that indirectly affects the amount of pressure relief provided to the output of pump assembly 100 through bypass orifice 408, electronic control unit 502 analyzes various input data signals from the vehicle. The software in the electronic control unit 502 represented by the block diagram in FIG. 6 includes the following sections: Input Signal Processing 530; Desired Flow Calculation 540; Desired Current Calculation 550 and Current Control 560.

Input signals include a steering wheel rotation signal 3; system pressure signal 5 from pressure sensor 504; electro-hydraulic current at 6; and vehicle battery voltage 7. These signals are filtered to a usable state and provided to the Desired Flow Calculation section 540. Desired Flow Calculation section 540 also receives vehicle speed signals 1; steering wheel angle position 2; engine rpm 4; brake signal 8 and an ignition signal 9. Additional signals such as steering system differential pressure 10, steering wheel torque 11, vehicle lateral acceleration 12, tie rod loads 13, and steering fluid flow rates 14 also may be employed. With these input signals, an algorithm is used to determine the appropriate amount of flow through steering assist valve 45 that is necessary for meeting desired steering feel requirements for the particular vehicle. That is, it determines the optimal flow that is necessary to maintain the desired steering feel to the operator. The output is a desired flow signal that is fed to the desired current section 550. This section also receives the engine speed signal and filtered pressure signal. This section utilizes an algorithm to calculate the pressure that is required in the supply side chamber 403 of flow control device 40 to produce the desired fluid flow through steering assist valve 45.

The desired electro-hydraulic current signal from the desired current section 550 is provided to the current control section 560 which activates electro-hydraulic valve 501 with a signal having a predetermined duty cycle to achieve the desired current through the coil of the electro-hydraulic valve 501. By monitoring the actual electro-hydraulic current, and the battery voltage level, the current control section 560 adjusts the output duty cycle to hold the current flow at the desired level.

When the vehicle is being driven without turning or braking, the amount of fluid flow through steering assist valve 45 that is needed to maintain power steering assist is relatively small. The present invention allows only the small required flow to occur, while diverting the excess flow from pump 16 and relieving the backpressure that would otherwise be present on the pump rotary unit. This action is achieved because EPC 500 adjusts the supply side pressure of flow control device 40 to small magnitudes while providing the desired flow to the steering system through steering assist valve 45. Consequently, pump 16 is not subject to the high pressures that are normally required to move spool 410 over by-pass orifice 408 in order to return excess flow.

It should be understood that the foregoing descriptions of the hydraulic flow valve, the power steering pump and the control circuit embodiments are merely illustrative of many possible implementations of the environments in which the present invention can be practiced. Those descriptions are not intended to be exhaustive of the many possible embodiments and implementations of the invention as set forth in the following claims.

We claim:

1. A power steering pump flow and pressure control system for providing hydraulic power from a hydraulic fluid pump to a vehicle steering assist module, the system comprising:
   a flow control device, including:
      an internal bore, and
      a slidable spool element carried in the bore;
   the flow control device being configured to receive fluid from the pump and to output a steering assist flow, directed to the steering assist module, and a return fluid flow, directed to a pump inlet, the amount of fluid in each flow being determined by the position of the spool element within the device and the position of the spool element being determined by fluid pressure balance within the flow control device, wherein:

the spool element sliding between a pump side chamber and a supply side chamber, the pump side chamber fluidly communicating with a first pressure relief channel, the supply side chamber fluidly communicating with a second pressure relief channel, and the return fluid flow being achieved by routing the fluid partially through the first pressure relief channel and partially through the second pressure relief channel;

an electronic control, in electronic communication with the vehicle, including the steering assist module and the pressure control system, adapted to control the pressure balance within the flow control device, the amount of return fluid flow routed through the second pressure relief line being controlled by the electronic control.

2. The power steering pump flow and pressure control system of claim 1, wherein:

the flow control device receives fluid from the pump at the pump-side inlet from an output line, at a supply side inlet via the second pressure relief channel;

the flow control device outputs the steering assist flow to the outlet line, in fluid communication between the flow control device and the steering assist module via a pump-side outlet located adjacent the pump-side inlet; and the flow control device outputs the return flow at the supply side inlet via the second pressure-relief channel; and the pump-side inlet and supply-side inlet being located at longitudinally opposite ends of the bore.

3. The power steering pump flow and pressure control system of claim 2, wherein the flow control device further includes:

a feedback line in fluid communication between the outlet line and the supply-side inlet; and the second pressure relief channel is a bypass line in fluid communication with a bypass orifice formed in the bore.

4. The power steering pump flow and pressure control system of claim 3, wherein the slidable spool element is configured to prevent longitudinal fluid flow past the spool element, the spool element:

has a longitudinal length less than that of the bore, thereby defining within the bore, the pump side chamber between the spool element and the pump inlet, and the supply side chamber between the supply inlet and the spool element; and is variably movable between a first position wherein the pump-side outlet is not blocked by the spool element and the bypass orifice is blocked by the spool element, and a second position wherein neither the pump-side outlet nor the bypass orifice is blocked by the spool element.

5. The power steering pump flow and pressure control system of claim 4, wherein the flow control device further includes biasing means for urging the spool element toward the first position.

6. The power steering pump flow and pressure control system of claim 3, wherein the flow control device further includes an electro-hydraulic valve, located in the bypass line and operatively connected to the electronic control.

7. The power steering pump flow and pressure control system of claim 1, wherein the flow control device further includes an electro-hydraulic valve, located in the second pressure-relief channel, and operatively connected to the electronic control.

8. The power steering pump flow and pressure control system of claim 1, wherein the flow control device further includes an electro-hydraulic valve, located in the second pressure relief channel and operatively connected to the electronic control, and wherein the electronic control varies the electro-hydraulic valve, responsive to communication from the vehicle and the system, to control the position of the spool element, providing maximum fluid flow to the steering assist module when required by the steering assist module, and otherwise diverting fluid flow to the pump inlet.

9. A power steering pump flow and pressure control system for providing hydraulic power to a vehicle steering assist module, the system comprising:

a hydraulic fluid pump;

an electronic control, in electronic communication with the vehicle, including the steering assist module and the pressure control system, for regulating pressure and flow within the system; and a flow control device, having a bore formed therein, in fluid communication with a pump output at a pump-side inlet via an output line, and with a pump input at a supply side inlet via a pressure-relief line, the pump-side inlet and supply-side inlet being located at longitudinally opposite ends of the bore, the flow control device including:

an electro-hydraulic valve, located in the pressure-relief line and operatively connected to the electronic control;

an outlet line, in fluid communication between the flow control device and the steering assist module via a pump-side outlet located adjacent the pump-side inlet;

a feedback line in fluid communication between the outlet line and the supply-side inlet;

the second pressure relief channel is a bypass line in fluid communication with a bypass orifice formed in the bore;

a spool element, slidably received within the bore and configured to prevent longitudinal fluid flow past the spool element, the spool element:

having a longitudinal length less than that of the bore, thereby defining within the bore a pump side chamber between the spool element and the pump inlet, and a supply side chamber between the supply inlet and the spool element; and being variably movable between a first position wherein the pump-side outlet is not blocked by the spool element and the bypass orifice is blocked by the spool element, and a second position wherein neither the pump-side outlet nor the bypass orifice is blocked by the spool element; and biasing means for urging the spool element toward the first position;

wherein the electronic control varies the electro-hydraulic valve, responsive to communication from the vehicle and the system, to control the position of the spool element, providing maximum fluid flow to the steering assist module when required by the steering assist module, and otherwise diverting fluid flow to the pump input, the diverting of the fluid flow being at least partially through the pressure relief line at the supply side inlet, based on an input received from the electronic control, and partially through a channel connecting the pump side chamber to the pump inlet, based on the position of the spool element within the bore.

10. The power steering pump flow and pressure control system of claim 9, wherein the electronic control further includes a pressure sensor for sensing pressure in the output line.

11. The power steering pump flow and pressure control system of claim 9, wherein the bypass orifice is formed in the bore such that the bypass orifice is completely blocked when the spool element is in the first position and completely uncovered when the spool element is in the second position, for providing variable flow in the bypass path line.

12. A method for reducing parasitic losses in a power steering system of an automotive vehicle, the system including a hydraulic fluid pump, a steering assist module, a flow control device, and an electronic control, comprising the steps of:
   receiving an output flow from the pump at the flow control device;
   dividing the output flow into a steering assist flow and a return flow at the flow control device, based on the position of a slidable spool element carried in a bore within the flow control device, and routing the return flow partially through a first pressure relief line fluidly communicating with a pump side chamber of the flow control device, and partially through a second pressure relief line communicating with a supply side chamber of the flow control device;
   sensing fluid flow requirements of the steering assist module at the electronic control;
      altering the position of the spool element by changing the pressure balance within the flow control device, responsive to the sensed requirements; and
      controlling the return flow routed through the second pressure relief line based on the sensed requirements.

* * * * *